United States Patent
Taira et al.

(10) Patent No.: US 10,374,383 B2
(45) Date of Patent: Aug. 6, 2019

(54) LASER IGNITION DEVICE

(71) Applicant: INTER-UNIVERSITY RESEARCH INSTITUTE CORPORATION NATIONAL INSTITUTES OF NATURAL SCIENCES, Mitaka-shi, Tokyo (JP)

(72) Inventors: Takunori Taira, Okazaki (JP); Hwan Hong Lim, Okazaki (JP)

(73) Assignee: INTER-UNIVERSITY RESEARCH INSTITUTE CORPORATION NATIONAL INSTITUTES OF NATURAL SCIENCES, Tokyo (JP)

( * ) Notice: Subject to any disclaimer, the term of this patent is extended or adjusted under 35 U.S.C. 154(b) by 0 days.

(21) Appl. No.: 15/952,762

(22) Filed: Apr. 13, 2018

(65) Prior Publication Data

US 2018/0309261 A1 Oct. 25, 2018

(30) Foreign Application Priority Data

Apr. 24, 2017 (JP) ................................. 2017-085731

(51) Int. Cl.
 *F02P 23/04* (2006.01)
 *H01S 3/11* (2006.01)
 (Continued)

(52) U.S. Cl.
 CPC ............. *H01S 3/1115* (2013.01); *F02P 23/04* (2013.01); *H01S 3/0627* (2013.01);
 (Continued)

(58) Field of Classification Search
 CPC .. H01S 3/1115; H01S 3/1643; H01S 3/09415; H01S 3/1611; H01S 3/094053;
 (Continued)

(56) References Cited

U.S. PATENT DOCUMENTS

| 5,265,116 A | * | 11/1993 | Mooradian | ........... H01S 3/0627 372/21 |
|---|---|---|---|---|
| 2011/0150026 A1 | * | 6/2011 | Tsunekane | .............. F02P 23/04 372/75 |
| 2015/0377207 A1 | | 12/2015 | Ridderbusch et al. | |

FOREIGN PATENT DOCUMENTS

| JP | 2006-144726 A | 6/2006 |
|---|---|---|
| JP | 2016-507903 A | 3/2016 |
| WO | 2014/122281 A1 | 8/2014 |

OTHER PUBLICATIONS

Hwan Hong Lim et al. "Continuously Pulse Width Tunable Nd:YAG Ceramic Micro Giant-Pulse Laser for Laser Induced Breakdown". Lasers Congress, 2016.

(Continued)

*Primary Examiner* — Xinning (Tom) Niu
(74) *Attorney, Agent, or Firm* — Oliff PLC

(57) ABSTRACT

To provide a laser ignition device in which the ignition efficiency is improved and the laser pulse energy necessary for ignition is minimized by optimizing the pulse time width of laser. The laser ignition device includes: a pulse laser oscillator 1 configured to output a beam having a wavelength $\lambda$ [μm] and a beam quality $M^2$; an energy controller 2 configured to control energy of pulse laser outputted from the pulse laser oscillator 1; a lens 3 having a focal length f [mm] and configured to focus the pulse laser outputted from the pulse laser oscillator 1; and a pulse time width controller 14 configured to control a time width of the pulse laser, wherein the pulse time width controller 14 controls the time width of the pulse laser to be 0.6 to 2 ns.

4 Claims, 4 Drawing Sheets

(51) Int. Cl.
*H01S 3/06* (2006.01)
*H01S 3/10* (2006.01)
*H01S 3/102* (2006.01)
*H01S 3/16* (2006.01)
*H01S 3/094* (2006.01)
*H01S 3/0941* (2006.01)
*H01S 3/113* (2006.01)
*H01S 3/00* (2006.01)

(52) U.S. Cl.
CPC ........ *H01S 3/1022* (2013.01); *H01S 3/10038* (2013.01); *H01S 3/0014* (2013.01); *H01S 3/0612* (2013.01); *H01S 3/09415* (2013.01); *H01S 3/094053* (2013.01); *H01S 3/094076* (2013.01); *H01S 3/113* (2013.01); *H01S 3/1611* (2013.01); *H01S 3/1643* (2013.01)

(58) Field of Classification Search
CPC .. H01S 3/1022; H01S 3/0627; H01S 3/10038; H01S 3/094076; H01S 3/0014; H01S 3/0612; H01S 3/113; F02P 23/04
See application file for complete search history.

(56) References Cited

OTHER PUBLICATIONS

Hwan Hong Lim et al. "Study on Laser Induced Air Breakdown Depending on Pulse Width and Intensity for Ignition". 54th Symposium (Japanese) on Combustion, Nov. 23-25, 2016.
Hwan Hong Lim et al. "Sub-Nanosecond Laser Induced Air-Breakdown with Giant-Pulse Duration Tuned Nd:YAG Ceramic Micro-Laser by Cavity-Length Control". Optics Express, Mar. 20, 2017, vol. 25, No. 6, pp. 6302-6310.
Takunori Taira. "Concept for Measuring Laser Beam-Quality Parameters". Laser Review, 1998, pp. 723-729.
C.H. Chan et al. "Significant Loss Mechanisms in Gas Breakdown at 10.6 microns". J. Appl. Phys., Mar. 1973, vol. 44, No. 3, pp. 1179-1188.

* cited by examiner

LASER IGNITION DEVICE

TECHNICAL FIELD

The present invention relates to a laser ignition device in which: laser light from a laser oscillator is focused by a lens onto a combustible air-fuel mixture; and the combustible air-fuel mixture is photoionized to be ignited.

BACKGROUND ART

Various laser ignition devices have hitherto been developed. For example, a laser ignition device is known in which the pulse time width of laser applied and focused in a cylinder is set to be a pulse time width which realizes a minimum ignition input energy (for example, see JP2006144726 (A)).

Meanwhile, a laser ignition system provided with a pulse laser oscillator and a lens which focuses a pulse laser beam in a cylinder is configured such that a pulse laser beam having a normalized fluence volume greater than 0.1 is generated (for example, see JP2016-507903 (A)).

In the conventional laser ignition device described above, the pulse time width of laser is not optimized. Thus, in the conventional laser ignition device, the laser pulse energy necessary for ignition is large and the ignition energy efficiency is low.

The present invention has been made in view of the above-described problem. An object of the present invention is to provide a laser ignition device in which the ignition efficiency is improved and the laser pulse energy necessary for ignition is minimized by optimizing the pulse time width of laser.

A laser ignition device of the present invention for solving the problem includes: a pulse laser oscillator configured to output a laser beam having a wavelength $\lambda$ [μm] and a beam quality $M^2$; an energy controller configured to control energy of pulse laser outputted from the pulse laser oscillator; a lens having a focal length f [mm] and configured to focus the pulse laser outputted from the pulse laser oscillator; and a pulse time width controller configured to control a pulse time width of the pulse laser, wherein the pulse time width controller controls the pulse time width of the pulse laser to be 0.6 to 2 ns. Accordingly, the dielectric breakdown intensity takes constant low values.

Another laser ignition device of the present invention for solving the problem includes: a pulse laser oscillator configured to output a laser beam having a wavelength $\lambda$ [μm] and a beam quality $M^2$; an energy controller configured to control energy of pulse laser outputted from the pulse laser oscillator; a lens having a focal length f [mm] and configured to focus the pulse laser outputted from the pulse laser oscillator; and a pulse time width controller configured to control a pulse time width of the pulse laser, wherein the pulse time width controller controls the pulse time width of the pulse laser to be 0.57 to 0.63 ns. Accordingly, the dielectric breakdown threshold fluence is minimized.

In the laser ignition device described above, preferably, the $M^2$ is less than 4. Accordingly, the diameter of the light-focused spot is decreased, and the laser pulse energy necessary for ignition is minimized.

In the laser ignition device described above, when a beam diameter of the pulse laser incident on the lens is D [mm], $f\lambda/D$ is set to be 1.4 to 3.5 μm, preferably, 2.1 to 2.8 μm.

The diameter of the light-focused spot where light is focused by a lens is proportional to $f\lambda/D$. Therefore, when f is decreased, the diameter of the light-focused spot is decreased, and thus, laser pulse energy necessary for dielectric breakdown is minimized. However, when f is decreased too much, electrons generated through dielectric breakdown diffuse to the outside of the light-focused spot, and thus, loss is increased. On the other hand, when f is increased, the diameter of the light-focused spot is increased, and thus, laser pulse energy necessary for dielectric breakdown is increased. That is, a trade-off relationship exists between low (high) dielectric breakdown energy and high (low) diffusion loss. An experiment by the inventors revealed that when $f\lambda/D$ is set to be 1.4 to 3.5 μm, preferably, 2.1 to 2.8 μm, dielectric breakdown energy is minimized.

The dielectric breakdown intensity is caused to take constant low values, and the ignition energy efficiency is enhanced.

EMBODIMENT 1

Figure 1:
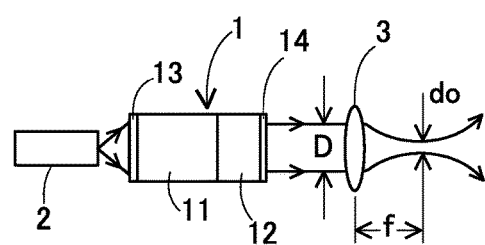
FIG. 1 is a schematic configuration diagram of a laser ignition device according to embodiment 1 of the present invention.

As shown in FIG. 1, a laser ignition device of the present embodiment includes: a pulse laser oscillator 1 configured to output a laser beam having a wavelength $\lambda$ [μm] and a beam quality $M^2$; an energy controller 2 configured to control energy of pulse laser outputted from the pulse laser oscillator 1; and a lens 3 having a focal length f [mm] and configured to focus the pulse laser outputted from the pulse laser oscillator 1. The pulse laser oscillator 1 includes a pulse time width controller 14 configured to control the pulse time width of the pulse laser.

As the pulse laser oscillator 1, a Q-switch pulse oscillator is preferable, but a mode-locked laser oscillator, a chirped pulse oscillator, or the like may be used. The pulse laser oscillator 1 of the present embodiment is a Q-switch pulse oscillator, and includes a gain medium 11, a Q-switch element 12, and resonator mirrors 13 and 14. The gain medium 11 may be any of carbon dioxide, ruby, glass, YAG, or the like, but a small and high efficiency YAG gain medium which allows use of a semiconductor laser for the energy controller 2 is preferable. As the gain medium 11 of the present embodiment, an Nd:YAG crystal is used.

As the Q-switch element 12, an optical switch such as an acoustooptic modulator or a Kerr shutter may be used, but a saturable absorber not requiring a driving power source is preferable. As the saturable absorber, a $Cr^{4+}$:YAG crystal is suitable because an Nd:YAG crystal is used as the gain medium 11. In the present embodiment, a monolithic chip of Nd:YAG/$Cr^{4+}$:YAG ceramic having a size of 3×3×7 (mm$^3$) and obtained through monolithic growth of the $Cr^{4+}$:YAG crystal 12 on the Nd:YAG crystal 11 is used. The input face of the Nd:YAG crystal 11 is coated with the resonator mirror (film) 13 which reflects, at a high reflectance, light having an oscillation wavelength λ (=1064 nm), and which does not reflect (transmits) a pump beam having a wavelength of 808 nm from the energy controller 2 described later. The resonator mirror 14 which reflects 50% of light having an oscillation wavelength λ (=1064 nm) and which transmits 50% of the light having an oscillation wavelength λ (=1064 nm) is disposed so as to be opposed to the $Cr^{4+}$:YAG crystal 12. The resonator mirror 14 is configured to be movable in the optical axis direction. Thus, as described later, if the resonator mirror 14 is moved in the optical axis direction to vary the interval between the resonator mirrors 13 and 14, the pulse time width can be varied, and thus, the resonator mirror 14 is a pulse time width controller.

The energy controller 2 includes: a quasi cw diode laser (wavelength: 808 nm, repetitive frequency: 100 Hz, peak power: 120 W, and pumping time: 500 μs); and a driving power source.

The reference character 3 represents a lens which has a focal length f and which focuses laser light having a beam diameter D and outputted from the Q-switch pulse oscillator 1, to cause dielectric breakdown in the focusing area.

In the laser ignition device of the present embodiment, the pulse time width is controlled to be 0.6 to 2 ns by the pulse time width controller (the resonator mirror 14 movable in the optical axis direction) which controls the time width of the pulse laser, and thus, a dielectric breakdown intensity having a constant low value is achieved.

$M^2$ is a factor that indicates how much the propagation state of the laser beam is impaired compared with the propagation state of an ideal $TEM_{00}$ fundamental Gaussian beam. In the case of a $TEM_{00}$ fundamental Gaussian beam, $M^2=1$. $M^2$ is obtained by measuring the beam radius and the spread angle (TAIRA, "Concept for Measuring Laser Beam-Quality Parameters" Reizar kenkyuu (provisional translation: Laser Review) October, 1998, pp. 723-729).

The focal volume (spot diameter $d_0$) when a Gaussian beam of $M^2=1$ (single mode) is focused varies in accordance with the beam diameter D, the wavelength λ, and the focal length f, and is expressed by the following formula.

$$d_0=1.27\lambda(f/D) \quad (1)$$

That is, the spot diameter $d_0$ is proportional to f when λ and D are constant. When f is small, the spot diameter $d_0$ becomes small, and diffused electrons generated through the dielectric breakdown are diffused outside the focal volume, and loss is increased. When f is large, the focal volume becomes large, and the dielectric breakdown energy is increased. That is, a trade-off relationship exists between low (high) dielectric breakdown energy and high (low) diffusion loss. An experiment by the inventors described later revealed that focusing a Gaussian beam having D=3 mm by means of a lens having f=6 to 8 mm produced a good focal volume, and that the dielectric breakdown energy was minimized.

When f=6 mm, $d_0$=2.7 μm is realized, and when f=8 mm, $d_0$=3.6 μm is realized. Thus, the following inequality is obtained.

$$(2.7/1.27)\ \mu m \leq (f\lambda/D) \leq (3.6/1.27)\ \mu m$$

$$2.1\ \mu m \leq (f\lambda/D) \leq 2.8\ \mu m \quad (2)$$

That is, if formula (2) is satisfied, the laser pulse energy necessary for dielectric breakdown is minimized.

Although formula (2) is best,
Formula (2A) as below $$1.4\ \mu m \leq (f\lambda/D) \leq 3.5\ \mu m \quad (2A)$$

may be satisfied.

A laser ignition device of a modification is configured such that: the pulse time width is controlled to be 0.6 to 2 ns by the pulse time width controller (the resonator mirror 14 movable in the optical axis direction); and formula (2) or formula (2A) is satisfied. As a result, the dielectric breakdown energy is minimized and the ignition energy efficiency is enhanced.

In the present embodiment or the modification, the diameter of the laser beam outputted from the pulse laser oscillator 1 is D. However, the diameter of the laser beam outputted from the pulse laser oscillator 1 may be D1 (≠D). In such a case, a telescope lens is disposed in front of the lens 3. The telescope lens makes D1 equal to D.

In the pulse laser oscillator 1 of the present embodiment or the modification, a monolithic chip of Nd:YAG/$Cr^{4+}$:YAG ceramic having a size of 3×3×7 ($mm^3$) and obtained through monolithic growth of the $Cr^{4+}$:YAG crystal 12 on the Nd:YAG crystal 11 is used. Thus, the pulse laser oscillator 1 of the present embodiment or the modification is a so-called microchip Q-switch laser oscillator. Since a laser ignition device is incorporated in an engine or the like, the laser ignition device needs to be small in size and robust. The pulse laser oscillator 1 of the laser ignition device according to the present embodiment or the modification is a microchip Q-switch laser oscillator, and thus, is small in size and robust.

EMBODIMENT 2

Figure 2:
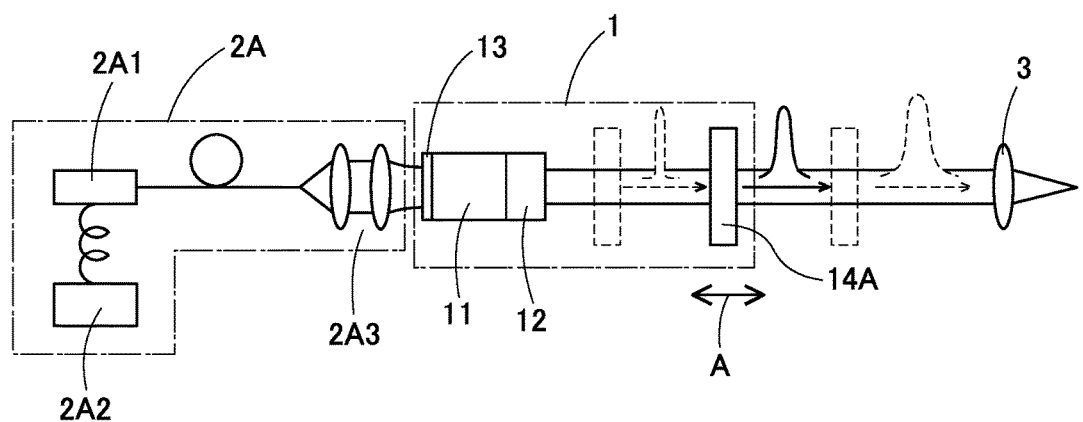
FIG. 2 is a schematic configuration diagram of a laser ignition device according to embodiment 2 of the present invention.

As shown in FIG. 2, a laser ignition device of the present embodiment is obtained by replacing the pulse time width controller 14 of embodiment 1 with a pulse time width controller 14A. The same components as the components of the laser ignition device of embodiment 1 are denoted by the same reference characters, and the description thereof is omitted.

The reference character 14A represents a resonator mirror separated from the Q-switch element 12, and is a quartz glass plate coated with a film which reflects 50% of oscillation light (oscillation wave length λ=1064 nm) and which transmits 50% of the oscillation light (oscillation wave length λ=1064 nm). The resonator mirror 14A is configured to be movable in the direction of an arrow A (optical axis direction).

A pulse width τ of the Q-switch laser is expressed by the following formula.

$$\tau \sim [r\eta(r)/\{r-1-\ln r\}]\tau_c$$

Here, $\tau_c$ is cavity lifetime (=cavity round trip time/cavity round trip loss), r is initial population inversion ratio, and η(r) is energy extraction efficiency. Therefore, if the reflection loss is the same as that of the medium, the shorter the cavity is, the shorter the pulse becomes. Thus, if the resonator mirror 14A set at the driving stage is moved in the direction of the arrow A (optical axis direction), the pulse time width τ is varied.

Instead of the pulse time width controller which varies the interval between the resonators according to the present embodiment, a pulse compressor or a pulse expander may be used as the pulse time width controller.

An energy controller 2A includes: a fiber (core diameter 0.6 mm)-coupled quasi cw diode laser 2A1 (wavelength: 808 nm, repetitive frequency: 100 Hz, peak power: 120 W, and pumping time: 500 μs); a driving power source 2A2 configured to drive the quasi cw diode laser 2A1; and an optical system 2A3 configured to couple a pump beam from the quasi cw diode laser 2A1 to the Nd:YAG crystal 11. The pump beam from the fiber is collimated as a diameter of 1.2 mm (full width half maximum) with the optical system 2A3.

The properties of the pulse laser oscillator 1 of the present embodiment are as follows.

Pulse width variable range: 0.5 to 9 ns
Pulse energy>2 mJ
Peak power: 0.5 to 6 MW
Repetitive frequency: 100 Hz
$M^2$=1 to 4

The laser ignition device of the present embodiment has the pulse time width controller 14A configured to control the time width of pulse laser, wherein the pulse time width controller 14A controls the time width of the pulse laser to be 0.57 to 0.63 ns. Thus, the dielectric breakdown threshold fluence is minimized.

Next, an air dielectric breakdown experiment performed by use of the laser ignition device of embodiment 2 is described.

<Experimental Setup>

Figure 3:
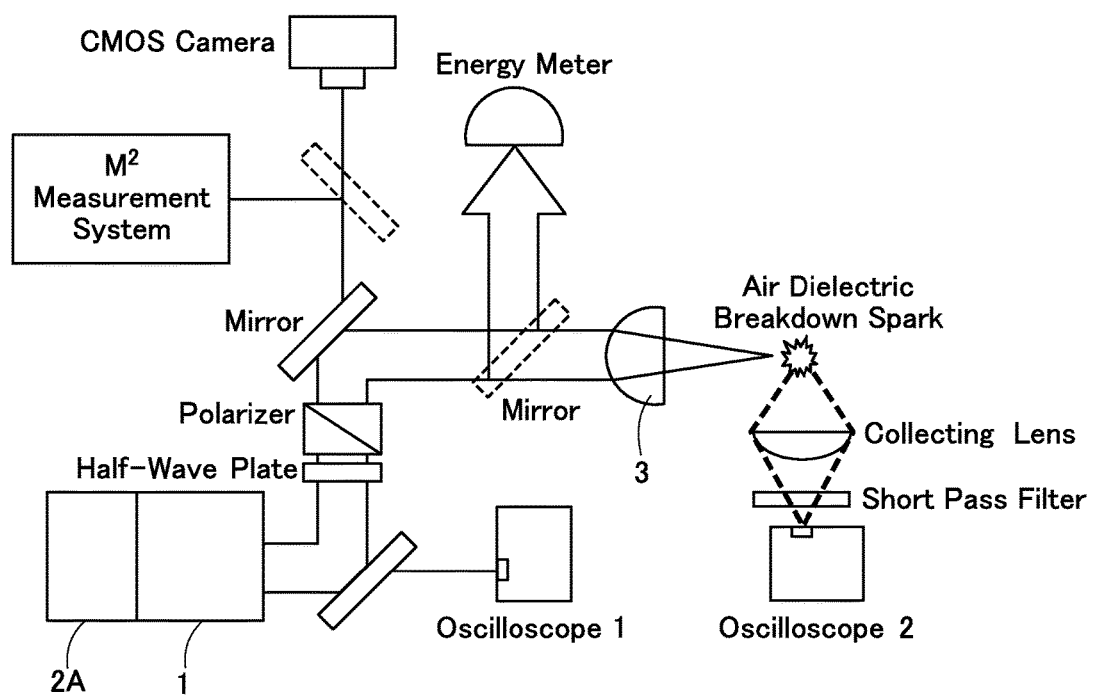
FIG. 3 is a schematic diagram showing an experimental setup including the laser ignition device according to embodiment 2.

An experimental setup as shown in FIG. 3 was configured by use of the laser ignition device according to embodiment 2 including the pulse-width variable Q-switch pulse oscillator 1, the energy controller 2A, and the lens 3.

In the present experiment, the driving power source 2A2 and the quasi cw diode laser 2A1 of the energy controller 2A were in full operation. The energy of the Q-switch pulse from the pulse-width variable Q-switch pulse oscillator 1 was varied by use of a half-wave plate and a polarizer. Linearly polarized laser light was focused in the air of the laboratory by each of the aspherical lenses 3 respectively having focal lengths of 6.24 mm, 8 mm, and 11 mm.

The beam size D on the lens 3 was measured by a CMOS camera disposed at a position at the same distance from the pulse-width variable Q-switch pulse oscillator 1. The $M^2$ value was taken by measuring the beam radius and the spread angle by use of a measurement system called Cinogy. The pulse shape and the pulse time width were measured by use of a 13-GHz oscilloscope (oscilloscope 1) coupled with a high-speed GaHs photodetector (rise time<25 µs). Dielectric breakdown was observed through observation of a visible dielectric breakdown spark by use of a 13-GHz oscilloscope (oscilloscope 2) coupled with a high-speed GaHs photodetector (rise time<30 µs) and a collecting lens.

<Experiment Result>

Figure 4:
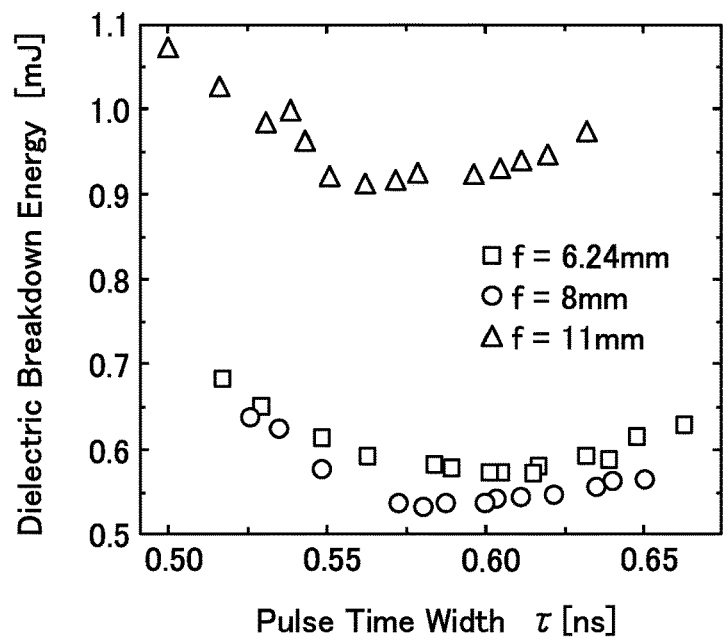
FIG. 4 is a graph showing pulse time width dependence of dielectric breakdown energy measured according to the experimental setup shown in FIG. 3.

FIG. 4 shows a result in which the dielectric breakdown energies according to the three lenses having different focal lengths were compared. FIG. 4 reveals that when the pulse time width $\tau$ is 0.5 to 0.67 ns, dielectric breakdown energy at a level of 0.5 to 1 mJ is necessary.

FIG. 4 also reveals that: when f=11 mm, the dielectric breakdown energy (indicated by Δ) is high; when f=8 mm, the dielectric breakdown energy (indicated by ○) is low; and when f=6.24 mm, the dielectric breakdown energy (indicated by □) is slightly increased. That is, the dielectric breakdown energy is dependent on the pulse time width $\tau$ and the focusing condition (focal volume). This is due to loss of diffused electrons to the outside of the focal volume (for example, see C. H. Chan, C. D. Moody, and W. B. McKnight, "Significant loss mechanisms in gas breakdown at 10.6µ" J Appl. Phys. 44 (3), 1179-1188 (1973)).

FIG. 4 reveals that focusing a Gaussian beam having D=3 mm by means of a lens having f=6 to 8 mm produces a good focal volume, and that the dielectric breakdown energy is minimized. This means that if formula (2) is satisfied, the dielectric breakdown energy is minimized.

Figure 5:
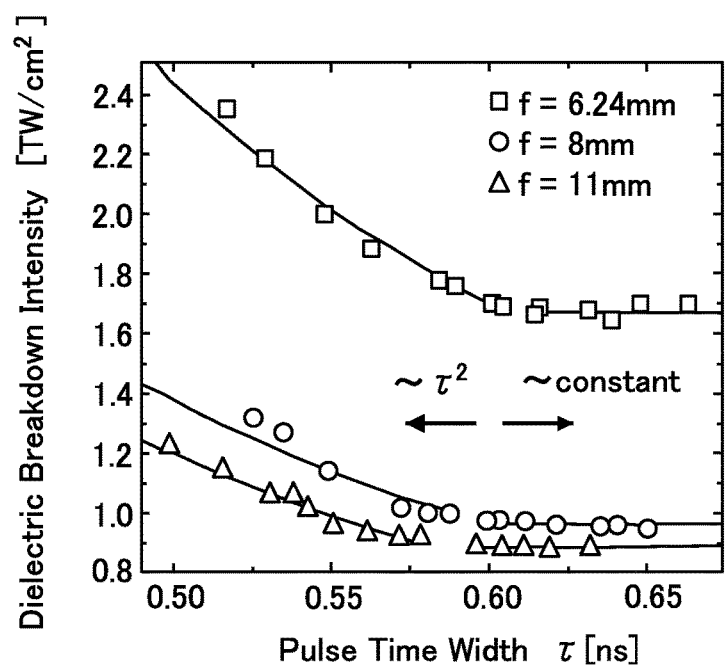
FIG. 5 is a graph showing pulse time width dependence of dielectric breakdown intensity measured according to the experimental setup shown in FIG. 3.

FIG. 5 shows the relationship between dielectric breakdown intensity and pulse time width. FIG. 5 reveals that when the pulse time width $\tau$ is 0.6 to 2 ns, the dielectric breakdown intensity takes constant low values.

Figure 6:
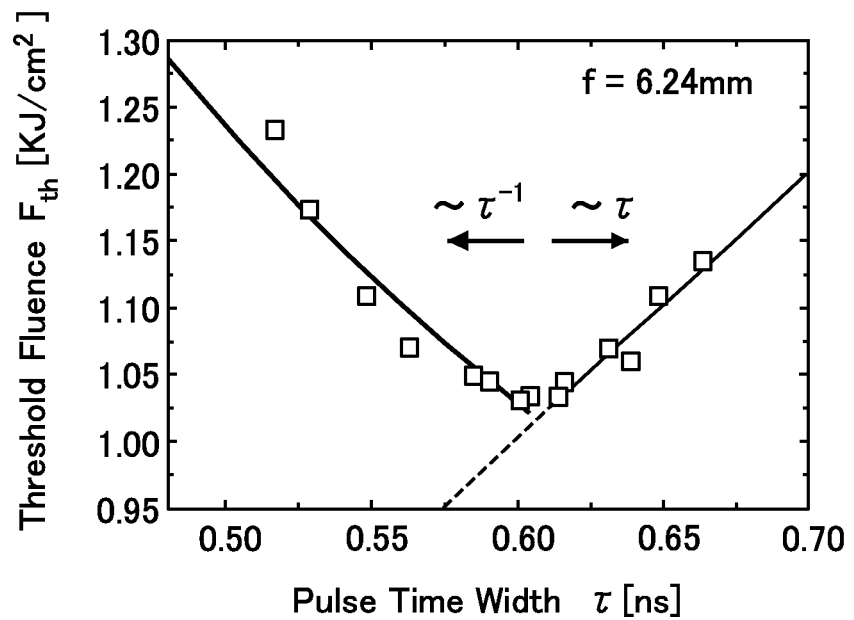
FIG. 6 is a graph showing pulse time width dependence of dielectric breakdown threshold fluence measured according to the experimental setup shown in FIG. 3.

FIG. 6 shows air dielectric breakdown threshold fluence expressed as a function of pulse time width measured when the lens 3 having a focal length of 6.24 mm was used. The threshold fluence $F_{th}$ [kJ/cm$^2$] was obtained through calculation based on the measured threshold energy and the size of the light-focused spot realized by the lens 3. The size of the light-focused spot was obtained through calculation, assuming that the laser beam (the measured value of beam size D~3 mm, $M^2$~3) incident on the lens 3 propagated in the form of the Gaussian beam propagation.

FIG. 6 reveals that the dielectric breakdown threshold fluence takes the minimum fluence of about 1.0 kJ/cm$^2$ when the pulse time width is 0.57 to 0.63 ns. FIG. 6 also reveals that the dielectric breakdown threshold fluence is proportional to the pulse time width $\tau$ in a long pulse range and is proportional to $\tau^{-1}$ in a short pulse range.

The invention claimed is:

1. A laser ignition device comprising:
   a pulse laser oscillator configured to output a beam having a wavelength $\lambda$ [µm] and a beam quality $M^2$;
   an energy controller configured to control energy of pulse laser outputted from the pulse laser oscillator;
   a lens having a focal length f [mm] and configured to focus the pulse laser outputted from the pulse laser oscillator; and
   a pulse time width controller configured to control a time width of the pulse laser, wherein
   the pulse time width controller controls the time width of the pulse laser to be 0.57 to 0.63 ns.

2. The laser ignition device according to claim 1, wherein the $M^2$ is less than 4.

3. The laser ignition device according to claim 1, wherein when a beam diameter of the pulse laser incident on the lens is D [mm], f$\lambda$/D is set to be 1.4 to 3.5 µm.

4. The laser ignition device according to claim 1, wherein when a beam diameter of the pulse laser incident on the lens is D [mm], f$\lambda$/D is set to be 2.1 to 2.8 µm.

* * * * *